June 11, 1929.  B. L. CONLEY  1,717,145
MOUNTING FOR ARMATURES
Filed Nov. 18, 1927
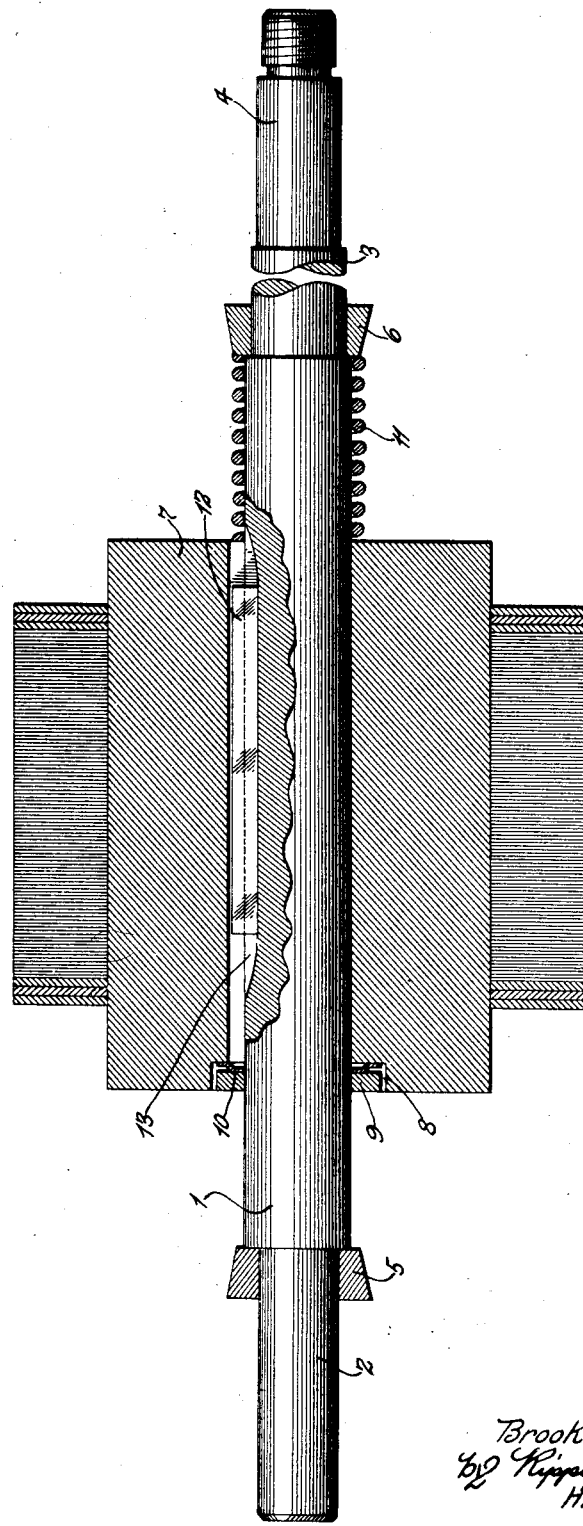
Inventor:
Brooks L. Conley,
by Rippey & Kingsland
His Attorneys.

Patented June 11, 1929.

1,717,145

UNITED STATES PATENT OFFICE.

BROOKS L. CONLEY, OF ST. LOUIS, MISSOURI, ASSIGNOR TO THE EMERSON ELECTRIC MFG. CO., OF ST. LOUIS, MISSOURI, A CORPORATION OF MISSOURI.

MOUNTING FOR ARMATURES.

Application filed November 18, 1927. Serial No. 234,090.

This invention relates to an improved mounting for an armature, and consists in the novel construction hereinafter disclosed.

It is known in the art that where an element is connected directly to an armature shaft of an electric motor and the shaft rotated certain vibrations are set up in the motor which are transmitted to the driven element, and also vibrations set up in the driven element are transmitted to the motor. This results in a noise when the device is in operation, which is particularly objectionable where the motor is used, for example, to drive a ventilating fan or similar device.

It is an object of the present invention to eliminate the vibratory noises as far as possible by providing a mounting on the shaft for the armature core of the motor, which shall be resilient longitudinally and circumferentially of the shaft, whereby the vibrations are absorbed or dissipated.

Additional advantages of the construction will be apparent from the following detailed description thereof, taken in connection with the accompanying drawing in which the single figure shows the construction in vertical section.

The embodiment of the invention illustrated in the drawing is shown as including an armature shaft 1 having an end portion 2 adapted to be mounted in a bearing in a motor housing, and a portion 3 adapted to be mounted in a bearing in the motor housing at the opposite side thereof. The forward end of the shaft 1 has a reduced porton 4 arranged to receive a driven element such, for instance, as a ventilating fan. The shaft is equipped with collars 5 and 6 pressed on the portions 2 and 3, respectively, at the base thereof.

The armature core 7 is provided with a central opening, and the central portion of the shaft 1 extends through said opening having a sliding fit therewith. The armature core 7 has a recess 8 at one end thereof, and the endwise movement of the armature core on the shaft 1 is limited by a collar 9 pressed on the shaft 1 and seating in the recess 8, there being disposed between the inner face of the collar and the base of the recess a spring washer 10 forming a resilient connection between the collar and the armature core. At the opposite end of the armature core and encircling the shaft 1 is a strong expansion spring 11, one end of which abuts against the outer face of the armature core and the other end of which abuts against the inner face of the collar 6. The tendency of the spring 11 is to force the armature core into frictional engagement with the spring washer 10 that abuts against the collar 9. The force of the spring serves to hold the armature core against appreciable endwise movement on the shaft; but, by the provision of the spring washer 10 and the spring 11, a longitudinal resilient support for the armature is provided which tends to reduce vibration in the armature core and to absorb such vibratory movement as may be developed in the armature core and prevent it from being imparted to the shaft.

The armature core 7 is circumferentially coupled to the shaft 1 by a key 12 seated in a key-way 13 in the shaft 1. The key 12 is made of formica, or similar resilient material thereby preventing any vibrations set up in the armature core from being imparted to the shaft and, likewise, any vibrations from the shaft being imparted to the armature core.

The construction as described provides means for rotating a driven element, such as a fan, which will be practically noiseless in operation, thus eliminating the disadvantages of a construction in which the armature core and the armature shaft are rigidly connected.

I am aware that the invention may be modified in numerous particulars without departing from the nature and spirit thereof.

I do not limit myself unessentially, but what I claim and desire to secure by Letters Patent is:—

1. A device of the class described comprising, in combination, an armature shaft adapted to be connected with a driven element; an armature carried by said shaft; resilient means for connecting the armature with said shaft endwise of the shaft, including a collar fixed to the shaft, a spring washer device between said collar and the armature, and an expansion spring actuating said armature against said spring washer.

2. In a device of the class described the combination of an armature shaft, an armature core slidably mounted on said shaft, a rigid abutment carried by said shaft, a cushion device between said abutment and one end of said armature core, a collar carried by said shaft, and an expansion spring abutting against said armature at one end and against said collar at the opposite end.

3. A device of the class described comprising, in combination, an armature shaft adapted to be connected with a driven element; an armature carried by said shaft; resilient means for connecting the armature with said shaft endwise of the shaft, including a collar fixed to the shaft, a spring washer device between said collar and the armature, and an expansion spring actuating said armature against said spring washer; and resilient means for connecting the armature circumferentially of the shaft.

4. In a device of the class described the combination of an armature shaft, an armature core slidably mounted on said shaft, a rigid abutment carried by said shaft, a cushion device between said abutment and one end of said armature core, a collar carried by said shaft, an expansion spring abutting against said armature core at one end and against said collar at the opposite end, and resilient means for connecting the armature core circumferentially of the shaft.

5. A device of the class described comprising, in combination, an armature shaft adapted to be connected with a driven element; an armature core carried by said shaft; resilient means for connecting the armature core with said shaft endwise of the shaft, including a collar fixed to the shaft, a spring washer device between said collar and the armature, and an expansion spring actuating said armature against said spring washer; and a key of resilient material interposed between said shaft and said armature core for connecting said armature core circumferentially of the shaft.

6. In a device of the class described the combination of an armature shaft, an armature core slidably mounted on said shaft, a rigid abutment carried by said shaft, a cushion device between said abutment and one end of said armature core, a collar carried by said shaft, an expansion spring abutting against said armature core at one end and against said collar at the opposite end; and a key of resilient material interposed between said shaft and said armature core for connecting said armature core circumferentially of the shaft.

7. A device of the class described comprising, in combination, a shaft adapted to be connected with a driven element; an armature carried by said shaft; an abutment fixed to the shaft, a resilient device between said abutment and the armature, and a spring mounted over the shaft and arranged to actuate the armature against said resilient device.

BROOKS L. CONLEY.